(12) United States Patent
Nicolau-Guillaumet (10) Patent No.: US 11,994,386 B2
(45) Date of Patent: May 28, 2024

(54) OPTICAL VEHICLE DIAGNOSTIC SYSTEM

(71) Applicant: RED TUNA, Hong Kong (CN)

(72) Inventor: Pierre Nicolau-Guillaumet, Bangkok (TH)

(73) Assignee: Red Tuna, Hong Kong (CN)

( * ) Notice: Subject to any disclaimer, the term of this patent is extended or adjusted under 35 U.S.C. 154(b) by 855 days.

(21) Appl. No.: 17/052,003

(22) PCT Filed: Apr. 30, 2019

(86) PCT No.: PCT/IB2019/000388
§ 371 (c)(1),
(2) Date: Oct. 30, 2020

(87) PCT Pub. No.: WO2019/211663
PCT Pub. Date: Nov. 7, 2019

(65) Prior Publication Data
US 2021/0239447 A1    Aug. 5, 2021

Related U.S. Application Data

(60) Provisional application No. 62/665,059, filed on May 1, 2018.

(51) Int. Cl.
*G01B 5/00* (2006.01)
*B62D 65/00* (2006.01)
(Continued)

(52) U.S. Cl.
CPC ......... *G01B 5/0025* (2013.01); *B62D 65/005* (2013.01); *G01B 11/002* (2013.01); *G01B 11/2441* (2013.01)

(58) Field of Classification Search
CPC .............. G01B 5/0025; G01B 11/2441; G01B 11/002; G01B 11/24; B62D 65/005
See application file for complete search history.

(56) References Cited

U.S. PATENT DOCUMENTS 4,015,338 A * 4/1977 Kunze ................. G01B 11/002
356/138
4,055,061 A * 10/1977 Bayorgeon ............... B21D 1/14
72/705
(Continued)

FOREIGN PATENT DOCUMENTS

CN         101311669 A     11/2008
CN         101907451 A     12/2010
(Continued)

OTHER PUBLICATIONS

International Search Report dated Sep. 26, 2019 issued in corresponding PCT/IB2019/000388 application (4 pages).
English Abstract of CN 101907451 A published Dec. 8, 2010.

*Primary Examiner* — Roy M Punnoose
(74) *Attorney, Agent, or Firm* — Millen, White, Zelano & Branigan P.C.; William F. Nixon (57) ABSTRACT

An optical measurement system for measuring one or more portions of an object such as a vehicle and solving the issues relating to attitude of vehicle while measuring the one or more portions of the vehicle, is disclosed. The optical measurement system comprising a diagnostic, measurement and repair equipment arranged on the object for example a vehicle via a rigid linking structure. The system comprises a measuring head and one or more targets comprising one or more set of photodiodes. The measuring head is mounted under or on the vehicle. The system is configured to measure parameters representative of the vehicle. The device further comprises a computing device in communication with the equipment, comprising set of instructions to determine a position of the target regarding to a reference point. The location of the point is then compared to an original location of the point to determine the damage in the vehicle.

16 Claims, 8 Drawing Sheets

(51) Int. Cl.
*G01B 11/00* (2006.01)
*G01B 11/24* (2006.01)

(56) References Cited

U.S. PATENT DOCUMENTS

| | | | | |
|---|---|---|---|---|
| 4,329,784 A * | 5/1982 | Bjork | ............... | G01B 5/0025 33/608 |
| 7,181,856 B1 * | 2/2007 | Hanchett | ............... | G01C 15/002 33/DIG. 21 |
| 7,352,455 B2 * | 4/2008 | Groothuis | ............... | G01B 11/002 356/155 |
| 7,570,352 B2 * | 8/2009 | Flannigan | ............... | G01B 5/0025 356/153 |
| 7,768,632 B2 | 8/2010 | Sotgiu | | |
| 7,874,078 B2 * | 1/2011 | Harrill | ............... | G01B 11/16 33/608 |
| 8,381,409 B2 * | 2/2013 | Knoke | ............... | G01B 11/24 33/228 |
| 8,997,361 B2 * | 4/2015 | Knoke | ............... | G01B 11/24 33/290 |
| 10,412,368 B2 | 9/2019 | Osterwood et al. | | |
| 10,948,713 B2 * | 3/2021 | Taylor | ............... | G01M 17/007 |
| 2005/0131586 A1 * | 6/2005 | Srack | ............... | G01B 5/0025 701/1 |
| 2008/0297777 A1 | 12/2008 | Sotgiu | | |
| 2011/0162221 A1 * | 7/2011 | Knoke | ............... | G01B 11/24 33/228 |
| 2016/0010980 A1 * | 1/2016 | Knoke | ............... | G01B 11/27 33/288 |
| 2016/0227193 A1 | 8/2016 | Osterwood et al. | | |
| 2019/0018234 A1 * | 1/2019 | Taylor | ............... | G02B 27/126 |

FOREIGN PATENT DOCUMENTS

| | | | |
|---|---|---|---|
| JP | 2016-513804 A | 5/2016 | |
| WO | WO-2017086771 A1 * | 5/2017 | ......... F16M 11/2014 |

* cited by examiner

OPTICAL VEHICLE DIAGNOSTIC SYSTEM

BACKGROUND

Field

The present invention generally relates to vehicle diagnosis, measurement and repair, and more specifically relates to an optical system to diagnose the state of the structure of a vehicle such as frame or body with a high degree of accuracy. The invention is also applicable to other technical fields whenever an optical system is needed to measure an object or to position captors or sensors for the measurement of objects.

Description of Related Art

As vehicles are becoming more advanced, the diagnostic, measurement and repair process of vehicle needs data that must be accurate. Also, the coachbuilders and insurance workers need a portable device that can give all information required to assess the state of the vehicle. This assessment must be done quickly with a high degree of accuracy. Some conventional system that addresses the above stated problems are explained as follows. Few devices involve setting a damaged vehicle on an elevator by at least three points, and the worker needs to assess, whether the vehicle is reparable or fit or not. If reparable, the repair needed is identified. However, these devices are cumbersome, require lot of time and skill to get accurate data and are also expensive. Few more types of existing systems include digital tram gauges, mechanical systems, measurement arms, visual and laser or ultrasound tracking.

The mechanical systems are basically a set of jigs that a user moves with a ruler on each axis. By reading this ruler for each axis, the user could identify the exact position of the points. However, this system is uneasy to maneuver, set and completely unpackable in a case. Tram gauges can be considered as the portable version of the mechanical systems. The tram gauge is basically a 3D ruler that can be fixed at one point below the vehicle and the other end of the ruler fixed at the required point to get an approximation of the distance between the two points. The tram gauges are a solution for portable devices, but the results of the measurements are not really accurate, and also the time required for a full assessment of the state of the vehicle is long. This device is used by insurance workers and coach repairers to assess the damages quickly on the vehicle, however, with a terrible lack of accuracy due to the adopted measuring solution.

Some system includes farrow arms to provide accurate estimation of the state of the vehicle. The principle of a farrow arm is to have a probe at the end of a long arm. This arm must be able to access any point of the vehicle. Then, the operator moves the probe, located at the end of the arm, to any points that need to be measured and trigger the measure when the touching probe seems to be located at the right place. The right place being set by an adaptor that fits in the hole or on the head of the screws that are on the vehicle. Those systems can be really accurate, but they require to be used by skilled workers, if not a wrong triggering, or the bad location of the probe at one measurement can provide the wrong information. In addition, those systems need a ground attachment, a heavy structure to maintain it in place, which make them unmovable for an insurance worker.

Currently some systems utilize a rotating laser set on the ground. The beam of the laser rotates at 360° and has to reach targets that are set on the required point of the structure of the vehicle. When the beam of the laser reaches a target, the distance is known between the points where the target is set and point of emission of the laser. Thus, a large number of targets is required to be set in all the points and measured at the same time by the laser. The targets are set on the vehicle by magnetism and measuring part of the target is just hanging by gravity, which ensure the verticality of the targets. However, this system requires leveling and can be inaccurate. It also lacks in repeatability. Indeed, the targets are set by gravity, so they are supposed to be perfectly vertical, so the distance between the measured point and the structure of the car need to be maintained constant. Which is not possible, as the first obvious reason is that the target is still free to move, so any doors or windows that open can induce a blow of wind and if it happens at the bad time, the measurement would go wrong, resulting in a huge lack of reliability and repeatability.

In addition to that, if the measuring surface of the targets are not set perpendicular enough to the beam of the laser then measuring mistakes are induced. In case of a change of the orientation of the targets, such as a rotation of the target along its vertical axis, an error could be induced.

In the light of above-mentioned problems, there exists a need in the art for an efficient movable measurement system in high accuracy, which permit the operator to proceed without need for leveling with all required measurements quickly.

SUMMARY OF THE INVENTION

The present invention discloses an optical system to diagnose the state of the structure of a vehicle with a high degree of accuracy. The system is configured to measure the position of points on the vehicle. The system is further configured to solve the issues relating to attitude of vehicle.

In an embodiment, the present invention comprises a datasheet comprising the accurate knowledge of the distance between the structure of the vehicle and the laser and targets. The data sheet are the results of measurements of all the interesting points on all the vehicle such as a car to know the orientation of each surface close to the point and the position of each point at the end of the manufacturing. This means that for every vehicle the operator would know where to set the measuring system and what are the geometric conditions of the set. The present invention further comprises a computing device comprising set of program instructions or program modules to calculate the distances with the information provided by the laser, and also allows the operator to get access to all that information and to tune the device for each measurement, to ensure the maximum accuracy.

The system further comprises a diagnostic equipment which is secured to the vehicle via a rigid linking structure to ensure accuracy and address the issue of conventional system by ensuring that all the distances are known and constant during all the measuring process. In addition, the present invention uses photodiodes to solve the issue of the orientation of the measuring surface. The target needs to be set approximately normal to the laser beam but a small change of angles for example, would not affect the accuracy of the measure. Moreover, the use of photodiodes makes it possible to have an automatic triggering, by focusing the laser beam on the photodiodes, which is avoiding the issues of human mistakes, as it was happening for farrow arms or arm gauges.

In another embodiment, the optical system for evaluating a frame of a vehicle comprising a diagnostic equipment arranged on the vehicle, a database comprising memory unit for storing vehicle information necessary to diagnose the vehicle, and a computing device in communication with the database and the diagnostic equipment via a wireless network. The diagnostic equipment comprising one or more target secured at a specific location of the vehicle having an electronic circuitry including a set of photodiodes, and a measuring head detachably mounted at a desired location via a linking structure. The measuring head comprises a laser configured to emit laser beam towards the photodiodes, and at least two encoders. In an embodiment, the laser is used to measure distance between the measuring head and the target. The at least two encoders of the measuring head, disposed in vertical axis and horizontal axis, respectively, collects data including distance between the point of emission of the laser and the photodiodes, angle between the direction of laser and horizontal axis, and orientation of the laser regarding the vertical axis, which is used to calculate the spherical coordinates of the target in the reference frame of the measurement head.

The computing device is configured to: receive data representative of parameters of a vehicle; determine a position of the target regarding to a reference point based on the parameters of the vehicle and the position of the point of the vehicle; and compare the position of the point of the vehicle with the vehicle information in the database i.e., the original location of the point of the vehicle to evaluate the state of the vehicle.

In an embodiment, a method of operating an optical system for evaluating a frame of a vehicle is disclosed. At one step, the diagnostic equipment is arranged on the vehicle by the following steps of: securing one or more target at a specific location of the vehicle, and attaching a measuring head at a desired location via a linking structure. The one or more target comprises an electronic circuitry including a set of photodiodes. The measuring head comprises the laser, which is configured to emit laser beam towards the photo diodes, and the at least two encoders, which is configured to generate parameters representative of the vehicle. At another step, a database comprising memory unit for storing one or more vehicle information necessary to diagnose, measure and repair the vehicle is provided. At another step, data representative of one or more parameters of a vehicle is received from the diagnostic equipment via a wireless network. At another step, a position of the target regarding to a reference point based on the parameters of the vehicle and position of the point of the vehicle is determined via the computing device. At another step, a position of the point of the vehicle with the vehicle information in the database is compared to evaluate the state of the vehicle.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The embodiments herein will be better understood from the following detailed description with reference to the drawings, in which.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Exemplary embodiments of the disclosure will be illustrated below in conjunction with the various figures.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated those individual aspects of the disclosure can be separately claimed.

The term "computer-readable medium" as used herein refers to any tangible storage and/or transmission medium that participates in storing and/or providing instructions to a processor for execution. Such a medium may take many forms, including but not limited to nonvolatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to email or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Further, while reference is made to various types of databases, all of the database functions may be stored within compartments of a single database or multiple databases. In any event, the disclosure is considered to include a tangible storage medium or distribution medium and known equivalents and successor media, in which the software implementations of the disclosure are stored.

Figure 1:
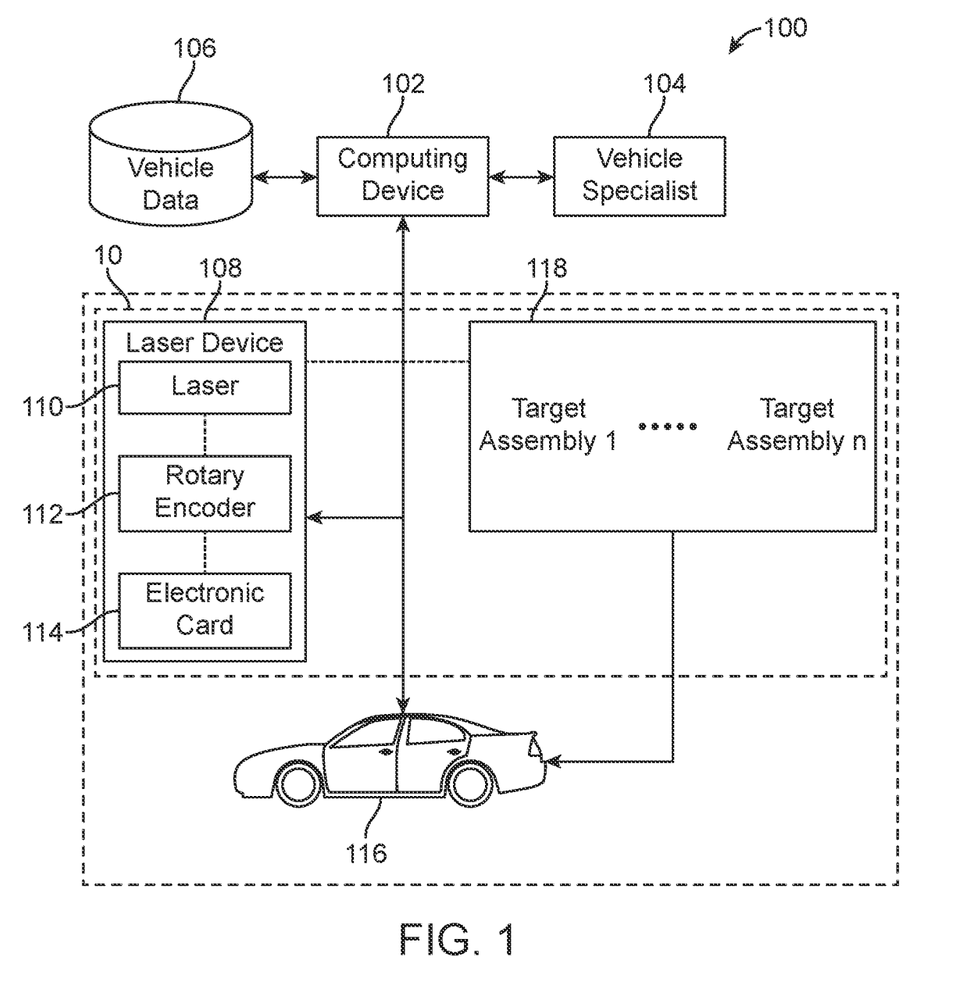
FIG. 1 exemplarily illustrates an environment for diagnosing the state of the vehicle utilizing optical system in an embodiment of the present invention.
Figure 3:
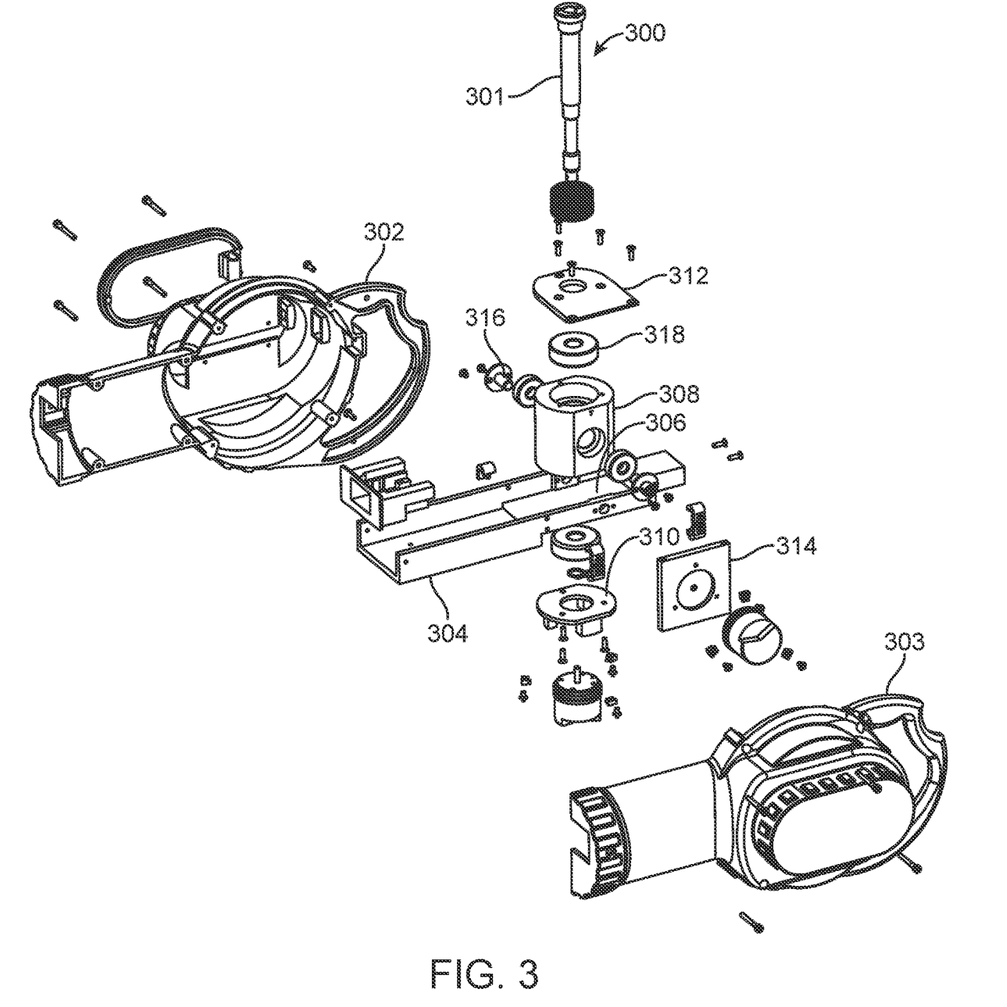
FIG. 3 exemplarily illustrates an exploded view of the measuring head in an embodiment of the present invention.

Referring to FIG. 1, an environment 100 for diagnosing, measuring and repair of a vehicle 116 utilizing optical system is disclosed, in an embodiment of the present invention. The optical system for evaluating a frame of the vehicle 116 comprising a diagnostic equipment 10 arranged on the vehicle 116, a database 106 comprising memory unit for storing vehicle information necessary to diagnose, measure and repair the vehicle 116, and a computing device 102 in communication with the database 106 and the diagnostic equipment 10 via a wireless network. In another embodiment, the computing device 102 in communication with the database 106 and the diagnostic equipment 10 via a wired means. The diagnostic equipment 10 comprising target assembly 1 to target assembly 118 is secured at a desired location of the vehicle 116. The target assembly comprises an electronic circuitry including at least one set of photodiodes. The diagnostic equipment 10 further comprises a measuring head 108 detachably mounted at a desired location via a linking structure of the measuring head 300, as shown in FIG. 3. The data sheet are the results of measurements of all the interesting points on all the vehicle such as car to know the orientation of each surface close to the point and the position of each point at the end of the manufacturing. This enables the vehicle specialist 104 to identify where to set the diagnostic equipment 10.

The measuring head 108 comprises a laser 110 configured to automatically emit laser beam towards the photodiode by the vehicle specialist 104, an electronic card 104, and at least two encoders. The laser 110 is used to measure distance between the measuring head 108 and the target. The at least two encoders, wherein at least one encoder disposed in vertical axis and at least one encoder disposed in horizontal axis, collects data including distance between the point of emission of the laser and the photodiode, angle between the direction of laser and horizontal axis, and orientation of the laser regarding the vertical axis, which is used to calculate the spherical coordinates of the target in the reference frame of the measuring head 108.

In an embodiment, the laser 110 is a rotating laser. In an embodiment, the at least two encoders are a rotary encoder 112. In some embodiment, the laser 110 generates one or more laser beams. Apertures are provided in laser 110 to permit the laser beams to pass there through. In an embodiment, the measuring head 108 is mounted under the vehicle 116. One or more targets 118 are placed in a screw holes or on bolts under a body of the vehicle 116. The measuring head 108 is configured to rotate in two directions to hit the target 118.

The computing device 102 is configured to: receive data representative of parameters of a vehicle 116; determine a position of the target regarding to a reference point based on the parameters of the vehicle 116 and the position of the point of the vehicle 116; and compare the position of the point of the vehicle 116 with the vehicle information in the database i.e., the original location of the point of the vehicle 116 to evaluate the state of the vehicle 116. The present invention further comprises a datasheet comprising the accurate knowledge of the distance between the structure of the vehicle and the laser and targets. The data sheet are the results of measurements of all the interesting points on all the vehicle such as car to know the orientation of each surface close to the point and the position of each point at the end of the manufacturing. This enables the vehicle specialist 104 to identify where to set the diagnostic equipment 10. The computing device 102 is detailed in FIG. 8.

Figure 2:
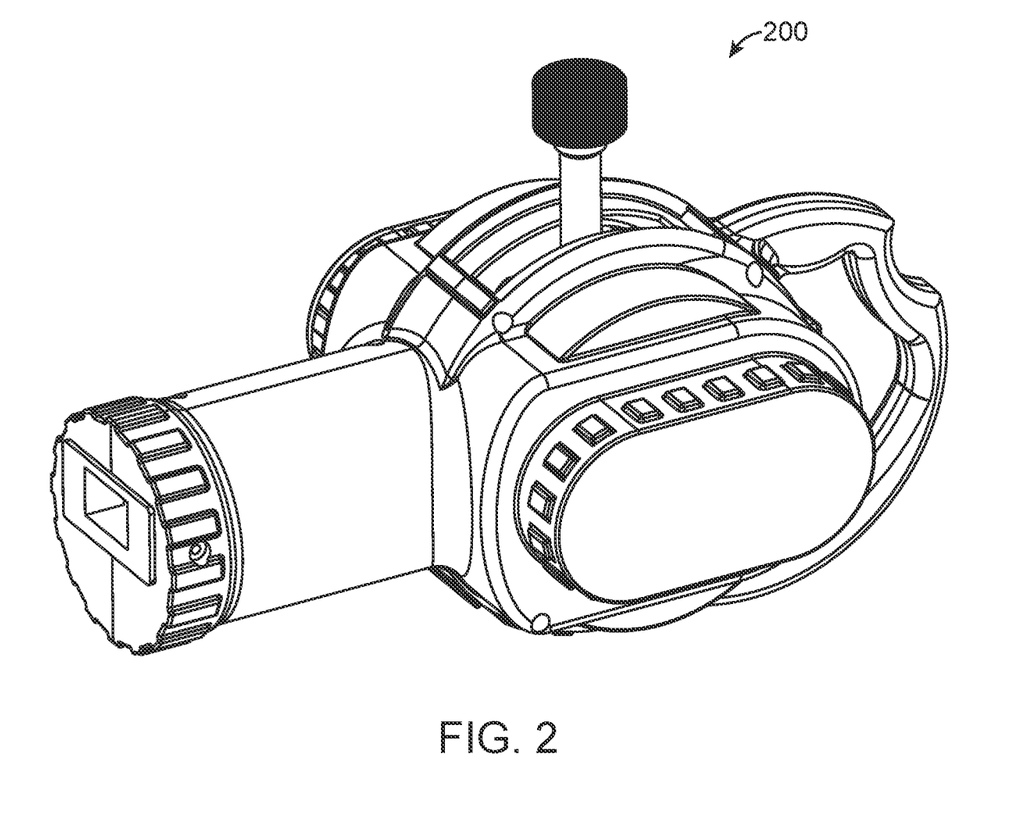
FIG. 2 exemplarily illustrates an assembled measuring head in an embodiment of the present invention.

FIG. 2. illustrates the measuring head 200 as assembled.

Referring to FIG. 3, an exploded view of the linking structure of the measuring head 300 is illustrated, in an embodiment of the present invention. The linking structure comprises a steel round pipe 301, measuring head external cover 302 and 303, an aluminum arm 304, an aluminum plate 306, a cylindrical assembly 308, an encoder supports 310, 312, a horizontal encoder support 314, an arm axis 316, an outer spacer 318. The linking structure supports the measuring head 300 comprising electronics card, the laser and the rotary encoders. The linking structure of the measuring head 300 include a steel pole 301 and a mechanical system for securing the measuring head to the vehicle at any desired position for measuring points.

Figure 4:
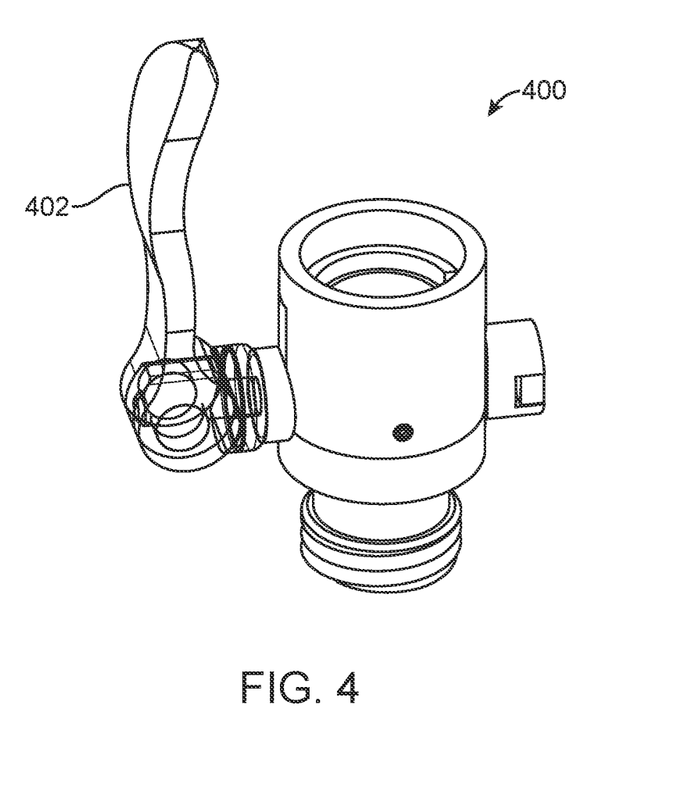
FIG. 4 exemplarily illustrates a magnetic bolt attachment for attaching target in an embodiment of the present invention.

Referring to FIG. 4, in an embodiment, the target includes at least one set of photodiodes and the electronics and is removably attached to the vehicle by a magnetic bolt attachment 400 which can be secured by a lever 402. Adaptors (not shown in FIG. 4) designed to fit all vehicles types of bolts can further be provided to connect the magnetic bolt attachment to the vehicle.

Figure 5A:
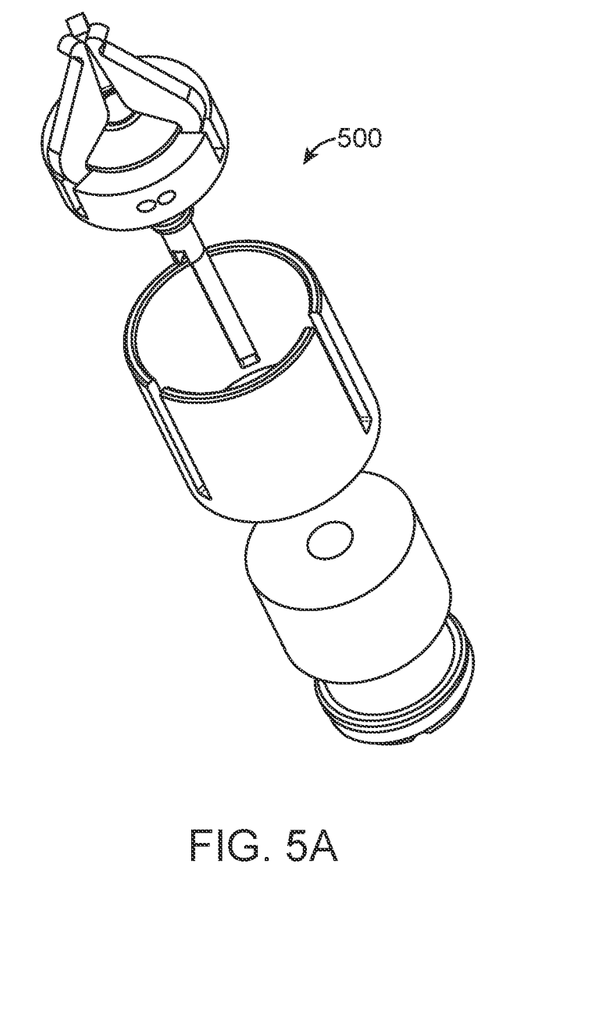
FIG. 5A exemplarily illustrates an exploded view of a hole attachment for target and measuring head in another embodiment of the present invention.
Figure 5B:
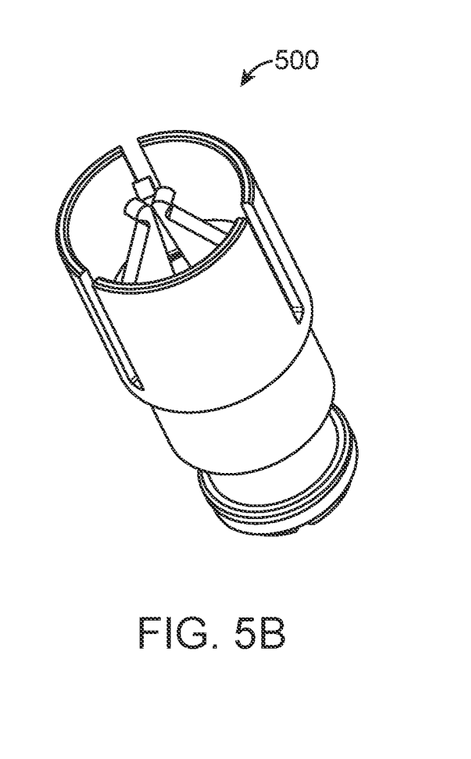
FIG. 5B exemplarily illustrates a hole attachment for target and measuring head in another embodiment of the present invention.

Referring to FIG. 5A and FIG. 5B, in another embodiment, the target includes at least one set of photodiodes and the electronics and is removably attached to the vehicle by a hole attachment 500.

Figure 6:
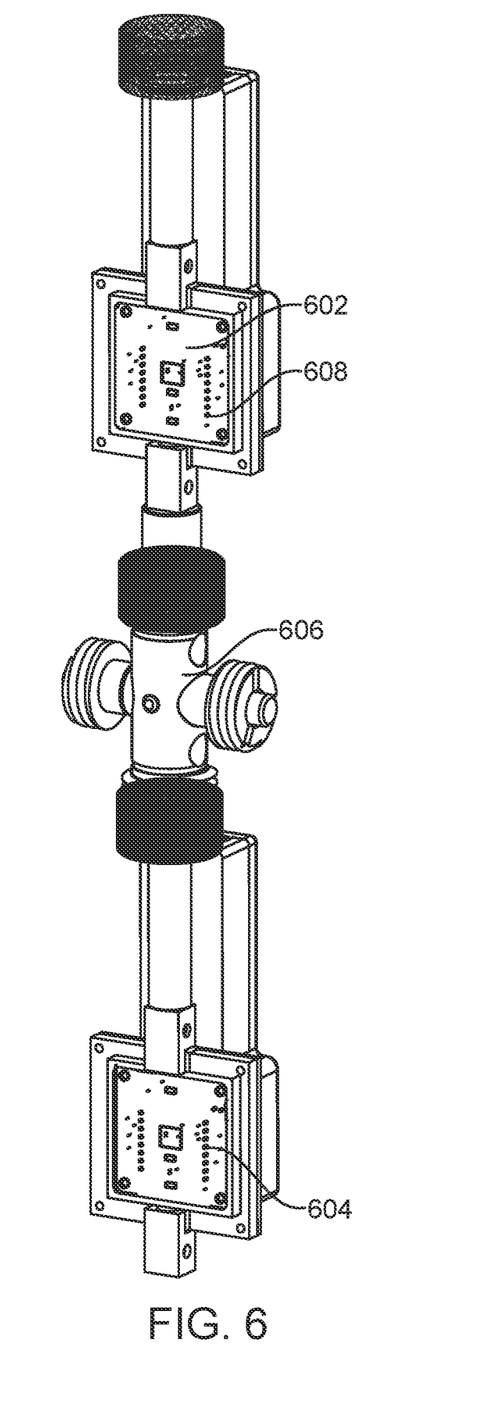
FIG. 6 exemplarily illustrates an assembly of two targets connected by a mechanical cross attachment.

FIG. 6 exemplarily illustrates an assembly of two targets 602, 604 removably attached to the vehicle by either a magnetic bolt or hole attachment and arranged to be removably connected by a mechanical cross attachment 606. The targets comprise photodiodes 608 configured to detect the laser beam.

The main advantage and purpose of the mechanical cross attachment system is to bring together a first and at least one second target so as to allow distance measurement between the measuring head and the second target in the event the laser beam would be obstructed by part of the vehicle frame due to the position of the first target. In addition, it may be advantageous in some circumstances to provide more than one target so as to improve accuracy of measurement or for measurement verification purposes of a point of reference.

Figure 7:
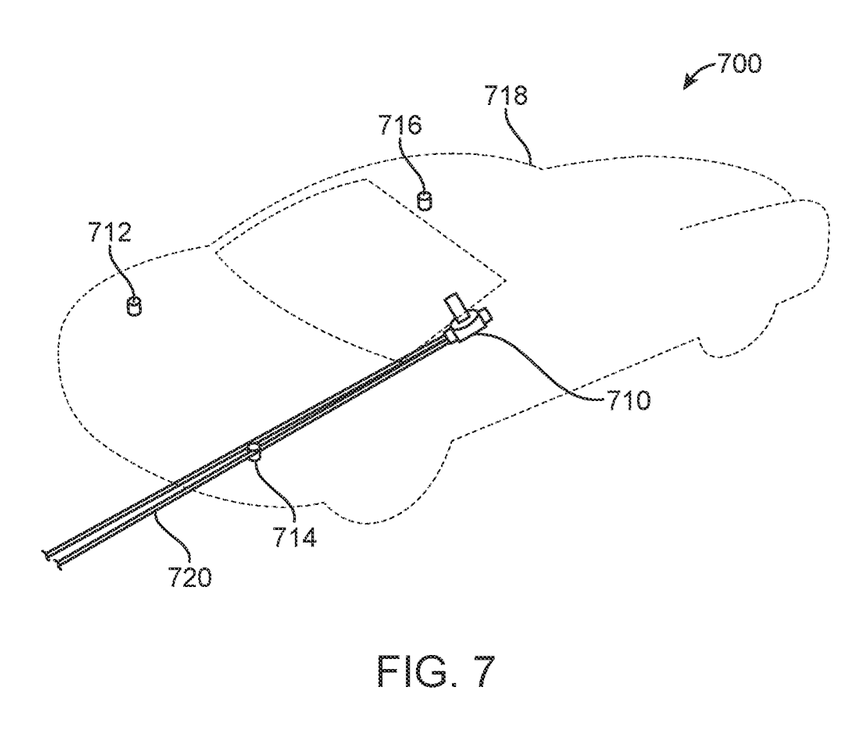
FIG. 7 exemplarily illustrates a perspective view of operation of the optical system in an embodiment of the present invention.

FIG. 7 exemplarily illustrates a perspective view of operation of the optical system in an embodiment of the present invention. The diagnostic equipment 10 (as shown in FIG. 1) arranged on the vehicle 700. The equipment comprises one or more target (712, 714, 716) secured at a desired location of the vehicle. Further, the target comprises an electronic circuitry including at least one set of photodiodes. A measuring head 710 detachably mounted at a desired location via a linking structure comprising, a laser configured to emit laser beam 720 towards the target 714, and the at least two encoders.

The main principle of the optical system is to measure the distance between the point of emission of the light of the laser from the measuring head 710 and the photodiode that are set on the targets (712, 714, 716). Further, the information including: the direct distance between the emission point of the laser 720 and the photodiode, called radial direction; the angle between the direction of the laser 720 and the horizontal axis, called the polar angle, which is delivered by a rotary encoder set on the structure; and the orientation of the laser 720 regarding the vertical axis, called the azimuthal angle, which is delivered by a rotary encoder set on the aluminum structure. With the above information, the computing device comprising set of instructions to process the position of the target 714 regarding to a reference point.

All the structures are designed in order to be rigid with no variation of the distance between either laser gun 710 and target 714, and the frame structure 718 of the vehicle 700. This rigidity characteristic enables the system to provide the required accuracy. Then when all the set targets (712, 714, 716) have been measured, the operator could move the targets (712, 714, 716) to other screw holes or interesting points and continue the full measurement of the system. In an embodiment, the diagnostic equipment 10 (as shown in FIG. 1) works directly with the computing device, which gives an access to the features of all the holes below all the cars. This function is useful for setting the laser gun 710, and it permits to know the geometrical features of the spot of the hole, which is essential to calculate the offset for the adaptor to avoid any mistake. In addition to that the knowledge of the software is useful to make a comparison between the measured values and the values that should normally exists for the vehicle.

Figure 8:
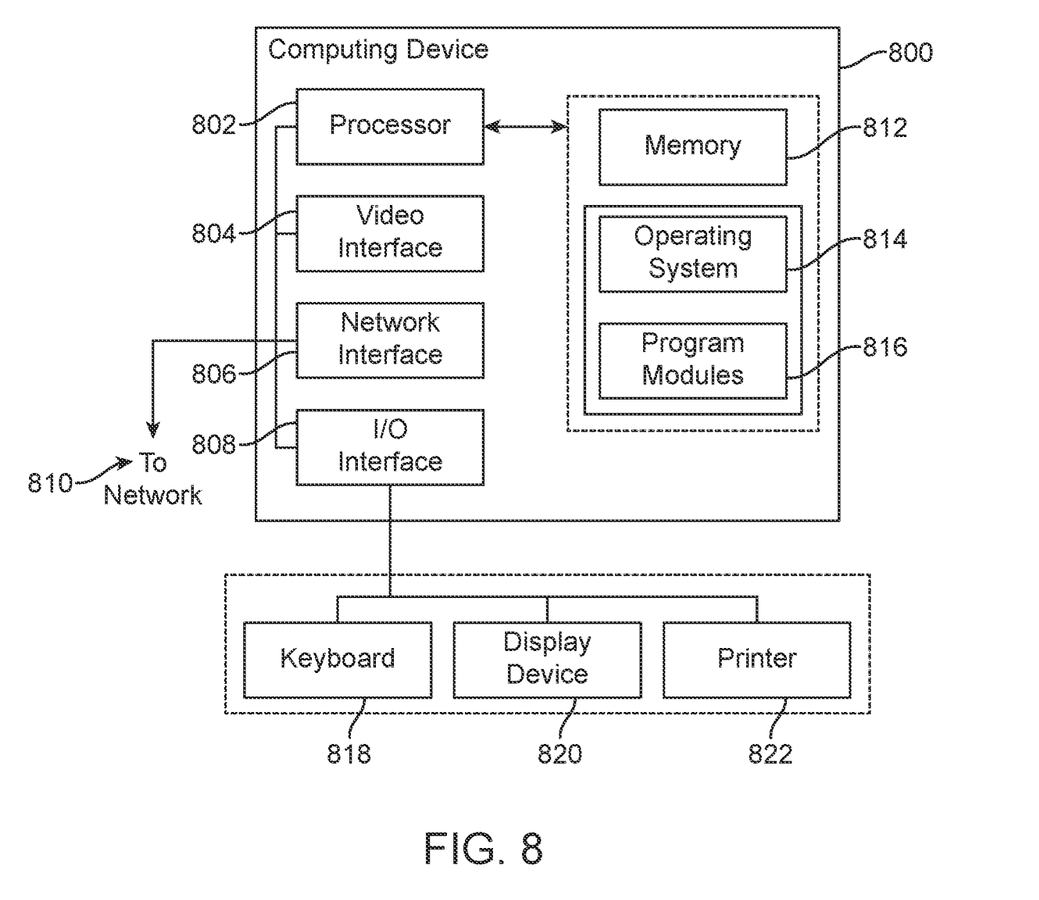
FIG. 8 exemplarily illustrates a block diagram of the computing device in an embodiment of the present invention.

FIG. 8 illustrates a schematic block diagram 800 illustrating an architecture of an example computing device. In one example, computing device is a personal computer. Other examples of computing device include a laptop computer, a smart phone, a personal digital assistant (PDA), or other devices capable of processing data instructions. In some embodiments, computing device operates to execute the operating system 814, and program modules 816. Computing device includes, in some embodiments, at least one processor 802. Further the computing device also includes memory 812. System memory 812 includes read-only memory (ROM) and random-access memory (RAM). Although the exemplary architecture described herein employs a hard disk drive as a secondary storage device, other types of computer readable media are included in other embodiments. Examples of these other types of computer readable media include magnetic cassettes, flash memory cards, digital video disks, compact disc read only memories, digital versatile disk read only memories, random access memories, or read only memories.

In some embodiments, the operator provides inputs to the computing device through one or more input devices. Examples of input devices include keyboard 818, display device 820. Other embodiments include other input devices, such as a microphone for receiving voice commands, touch screen or touch pad. Input devices are connected to the processor 802 through input/output interface 808 that is coupled to the processor. Wireless communication between input devices and interface 808 is possible as well, and includes infrared, BLUETOOTH® wireless technology, cellular communication, or other radio frequency communication systems in some possible embodiments. In some embodiments, a display device 820, such as a monitor, liquid crystal display device, projector, or touch screen display device, is also connected the computing device via an interface, such as video interface 804. In addition to display device 820, the computing device can include various other peripheral devices (not shown), such as speakers or a printer 822.

When used in a local area networking environment or a wide area networking environment (such as the Internet), computing device is typically connected to network 810 through a network interface or adapter 806. Other possible embodiments use other communication devices. For example, some embodiments of computing device include a modem for communicating across network. For example, in some embodiments a network interface or adapter 802 permits computing device to communicate with a remote server or other remote computing device. As an example, the remote server includes a database that stores vehicle frame dimensions and other vehicle data. The data can be downloaded by computing device from the server through network interface 806.

In some embodiment, the system could be used with a software which is made available via a web link to diagnose the state of the structure of a car with a high degree of accuracy.

In an embodiment, a method of operating an optical system for evaluating a frame of a vehicle is disclosed. At one step, the diagnostic equipment is arranged on the vehicle without need for leveling by the following steps of: securing one or more target at a specific location of the vehicle, and attaching a measuring head at a desired location via a linking structure. The one or more target comprises an electronic circuitry including at least one set of photodiodes. The measuring head comprises the laser, which is configured to emit laser beam towards the photodiodes, and the at least two encoders, which is configured to generate parameters representative of the vehicle. At another step, a database comprising memory unit for storing one or more vehicle information necessary to diagnose the vehicle is provided. At another step, data representative of one or more parameters of a vehicle is received from the diagnostic equipment via a wireless network. At another step, a position of the target regarding to a reference point based on the parameters of the vehicle and position of the point of the vehicle is determined via the computing device. At another step, a position of the point of the vehicle with the vehicle information in the database is compared to evaluate the state of the vehicle.

Advantageously, the present invention provides a low-cost solution to acquire data on the structure of the vehicle. The system is compact in size with an accuracy close to the millimeter. The advantage of this system is to permit to somebody to transport the device and then to make the measurement quickly, with an average set-up and complete diagnostic time of 20 min.

According to the present invention, the measuring head is fixed under the vehicle at a single known point and therefore does not require leveling, which avoids mistakes occurring in prior art due to leveling. Errors in leveling occur in prior art due to the fact that leveling requires at least three distant reference points on a vehicle and that the relative position of these reference points could have shifted in a damaged vehicle compared to original positioning of these reference points as per manufacturer specifications. If leveling is not correct, further measurements will not be correct.

In one other embodiment, the measuring head could be placed on the vehicle such as on top of the vehicle or the side of the vehicle and the invention could be used for calibration and placement of further targets for measurement of other dimensions.

Further, the present invention avoids human error caused by manual operation of a farrow arm or other existing systems, as the measuring head of the present invention automatically triggers the measuring when the laser beam hits the photodiodes placed as targets. The present invention could also be used in other applications in the construction, oil and gas or automotive industry in particular, for example for positioning sensors or captors on vehicles as well as in other industries whenever an optical system is needed to measure an object or to position captors for the measurement of objects.

Although a single embodiment of the invention has been illustrated in the accompanying drawings and described in the above detailed description, it will be understood that the invention is not limited to the embodiment developed herein, but is capable of numerous rearrangements, modifications, substitutions of parts and elements without departing from the spirit and scope of the invention.

The components of the system illustrated are not limited to the specific embodiments described herein, but rather, features illustrated or described as part of one embodiment can be used on or in conjunction with other embodiments to yield yet a further embodiment. It is intended that the system include such modifications and variations. Further, steps described in the method may be utilized independently and separately from other steps described herein.

The devices, systems, and methods have been described above, with reference to specific embodiments. Various changes may be made and equivalents may be substituted for elements thereof without departing from the scope of the disclosure. In addition, many modifications may be made to adapt a particular situation or material to the teachings found herein without departing from the essential scope thereof.

The disclosure, in various embodiments, configurations and aspects, includes components, methods, processes, systems and/or apparatuses as depicted and described herein, including various embodiments, sub-combinations, and subsets thereof. The various disclosed embodiments, configurations, and aspects include providing devices, systems, and processes in the absence of items not depicted and/or described herein or in various embodiments, configurations, or aspects hereof, including in the absence of such known items.

The foregoing discussion of the exemplary embodiments has been presented for purposes of illustration and description. The foregoing is not intended to limit the scope of the disclosure to the form or forms recited herein. In the foregoing Detailed Description for example, various features of the exemplary embodiments are grouped together in one or more embodiments, configurations, or aspects for the purpose of streamlining the disclosure. The features of the embodiments, configurations, or aspects of the exemplary embodiments may be combined in alternate embodiments, configurations, or aspects other than those discussed above. This method of disclosure is not to be interpreted as reflecting an intention that the exemplary embodiments require more features than may be recited in each claim. Thus, the following claims are hereby incorporated into this Detailed Description, with each claim standing on its own as a separate illustrative embodiment.

Moreover, the description of the exemplary embodiments has included descriptions of one or more embodiments, configurations, or aspects, and certain variations and modifications, other variations, combinations, and modifications that are within the scope of the disclosure including alternate, interchangeable and/or equivalent structures, functions, ranges or steps to those claimed, whether or not such alternate, interchangeable and/or equivalent structures, functions, ranges or steps are disclosed herein.

In this specification and the claims that follow, reference will be made to a number of terms that have the following meanings. The singular forms "a," "an" and "the" include plural referents unless the context clearly dictates otherwise. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges there between. Variations in such ranges are possible consistent with this disclosure, including the claims, which does not limit potential variations to disclosed ranges.

Advances in science and technology may make equivalents and substitutions possible that are not now contemplated by reason of the imprecision of language; these variations should be covered by the appended claims. This written description uses examples to disclose the method, machine and computer-readable medium. Other examples consistent with this disclosure may exist and are encompassed by the disclosure.

What is claimed is:

1. An optical system for evaluating a structure of a vehicle such as frame or body, comprising:
   a diagnostic device arranged on the vehicle comprising,
      one or more targets secured at a specific location of the vehicle having an electronic circuitry including at least one set of photodiodes, and
      a measuring head detachably mounted at a desired location via a linking structure comprising,
         a laser configured to emit laser beam towards the at least one set of photodiode, and
         at least two encoders configured to generate parameters representative of the vehicle;
   a database comprising memory unit for storing one or more vehicle information necessary to diagnose the vehicle; and a computing device in communication with the database and the diagnostic device via a wireless network, configured to:
receive data representative of one or more parameters of the vehicle,
determine a position of the target to a reference point based on the parameters of the vehicle, and
compare the position with the vehicle information in the database to evaluate the state of the vehicle.

2. The system of claim 1, wherein the parameters representative of the vehicle comprises,
(a) distance between a point of emission of the laser and the at least one set of photodiode,
(b) angle between a direction of laser and horizontal axis, and
(c) orientation of the laser regarding a vertical axis.

3. The system of claim 1, wherein the target is secured to the specific location of the vehicle via a magnetic or mechanical attachment.

4. The system of claim 1, wherein the targets are configured to be rigidly arranged on the vehicle.

5. The system of claim 1, wherein the at least two encoders are rotary encoders.

6. The system of claim 1, wherein the laser is a rotating laser.

7. The system of claim 1, wherein the measuring head and the target are mounted under the vehicle.

8. The system of claim 1, wherein the measuring head is configured to rotate in two directions to hit the target.

9. The system of claim 1, wherein the wireless network is at least anyone or combination of Wi-H network, WiMax network, or wireless local area network.

10. The system of claim 1, wherein the computing device is at least one of tablet computers, personnel computers, personnel digital assistants, smart phones, smart televisions, palm tops, phablets and laptops.

11. The system of claim 1, wherein the memory unit is at least one of a volatile memory, non-volatile memory, read only memory (ROM), random access memory (RAM), and a flash memory.

12. A method for operating an optical system for evaluating a structure of a vehicle such as frame or body, the method comprising the steps of:
arranging a diagnostic device on the vehicle comprising the steps of
securing one or more targets at a specific location of the vehicle having an electronic circuitry including at least one set of photodiodes, and
attaching a measuring head at a desired location via a linking structure comprising,
a laser configured to emit laser beam towards the photo diodes, and
at least two encoders configured to generate parameters representative of the vehicle;
providing a database comprising memory unit for storing one or more vehicle information necessary to diagnose the vehicle;
receiving data representative of one or more parameters of the vehicle from the diagnostic device via a wireless network, at a computing device in communication with the database;
determining, via the computing device, a position of the target regarding to a reference point based on the parameters of the vehicle, and
comparing, via the computing device, the position with the vehicle information in the database to evaluate the state of the vehicle.

13. The method of claim 12, wherein parameters representative of the vehicle comprises,
(d) distance between a point of emission of the laser and the photodiode,
(e) angle between a direction of laser and horizontal axis, and
(f) orientation of the laser regarding a vertical axis.

14. The method of claim 12, wherein the targets are configured to be rigidly arranged on the vehicle without variation of the distance between the targets and the structure of the vehicle to provide accurate parameters.

15. The method of claim 12, wherein the measuring head and target are mounted and fixed under the vehicle.

16. The method of claim 12, wherein the measuring head is configured to rotate in two directions to hit the target.

* * * * *